May 9, 1961
H. VON RATH
2,983,008
MOLDING FASTENER
Filed Sept. 12, 1958
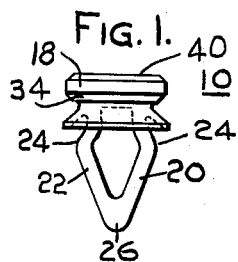
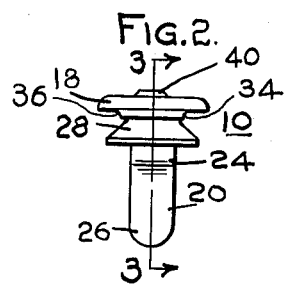
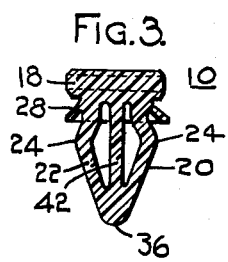
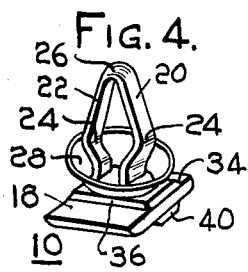
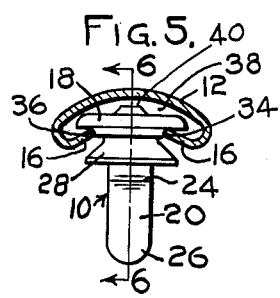
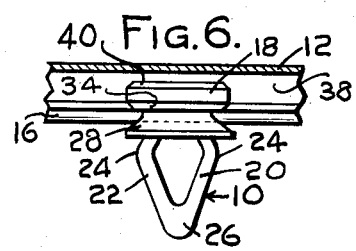
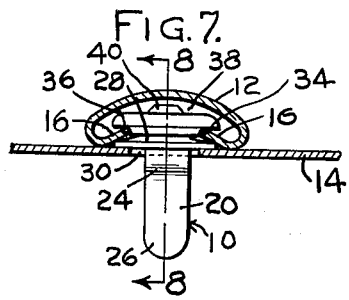
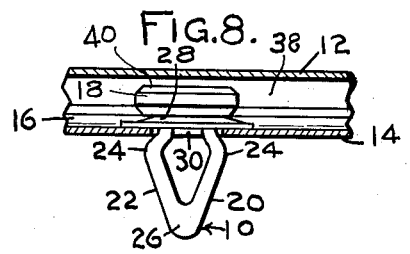
INVENTOR:
HERBERT VON RATH,
BY Walter S. Jones
ATTORNEY.

United States Patent Office 2,983,008
Patented May 9, 1961

2,983,008

MOLDING FASTENER

Herbert von Rath, Kandern, Oelmaettle, Germany, assignor to A. Raymond, Lorrach Baden, Germany, a firm Filed Sept. 12, 1958, Ser. No. 760,650

Claims priority, application Germany Sept. 14, 1957

1 Claim. (Cl. 24—73)

This invention relates to fastening devices and in particular to a fastener for fastening molding strips or the like to a panel.

Various types of fastening devices are known in the automotive industry to fasten hollow trim strips on car body walls. Devices commonly used for this purpose have the disadvantage of not sealing the apertures so that moisture and water can penetrate into the interior of the car body, and being constructed of metal are normally not corrosion resistant so that after exposure to the weather, they lose their inherent resilient characteristics and defeat the purpose for which they were designed.

The object of this invention is to provide a non-metallic fastening device for rapidly and economically attaching a channel molding to a supporting panel.

A further object of this invention is to provide a molding fastener which has an integral sealing portion molded therewith.

A further object of this invention is to provide a molding fastener which is adapted for blind assembly into an apertured panel.

Other objects of the invention will, in part, be obvious, and will, in part, appear hereinafter.

In the drawing:

Fig. 1 is a view in front elevation of the fastening device;

Fig. 2 is a side view of a modified form;

Fig. 3 is a view in section taken on line 3—3 of Fig. 2;

Fig. 4 is a view in prospective of the fastening device embodying the features of the invention;

Fig. 5 is a view partially in section of the application of a trim molding to the fastener;

Fig. 6 is a view taken on line 6—6 of Fig. 5 showing the fastener in elevation;

Fig. 7 is a view similar to Fig. 5 showing the fastener and molding assembled on a panel; and Fig. 8 is a view taken on line 8—8 of Fig. 7, partly in elevation.

Referring to the drawings, there is illustrated a molding fastener 10 which is adapted for attaching a molding 12 to a support 14. The support 14 may be a portion of an automobile body or the like and the molding has inturned edges 16. The fastener 10 comprises generally a base 18 which is formed entirely of resilient plastic material having dependent leg portions 20 and 22 and provided in a known manner with bends 24 and converging at a point 26 at the lower apex. Extending downwardly from the base portion there is formed a resilient packing bell 28 which is highly resilient so that when the fastener 10 is pressed with the molding strip 12 into an aperture 30 in the support 14, the bell 28 expands and fits tightly over the aperture 30 in the support so that it forms a reliable seal against moisture penetrating from the outside. The base portion 18 has shoulders 34 and 36 on the opposed sides, arranged parallel with each other so that their distance corresponds to the inner diameter of the trimming strip to be attached. To assemble the molding onto a panel by means of the fastening device 10, the fastener 10 is introduced into the molding 12 as illustrated in Figs. 5 and 6, the resilient packing bell 28 protruding over the lower edge when the molding 12 is pressed with the fasteners into the aperture 30 of the support 14 as shown in Fig. 7. The packing bell 28 resiliently expands and fits tightly against the support 14 (Figs. 7 and 8) sealing the aperture so that it will be resistant to the ingress of water. The lower part of the fastener 10 being formed of a resilient plastic is formed so that the distance across the bends 24 is greater than the diameter of the aperture 30. It will thus readily be seen that due to the inherent characteristics of the material used, the leg portions 20 and 22 will flex inwardly toward each other to allow the fastener to enter into snap engagement with the panel. After the bends 24 have passed through the aperture, the leg portions will expand to their normal position and effect a strong support by bearing against the underside of the panel.

Since the molding opening 38 as illustrated in Fig. 5 has great tolerance in height and width so that the free motion of the fastener in the longitudinal direction of the trimming strip becomes rather difficult, the fastener is provided with a narrow rib 40 which will bear against the inner surface of the molding and serves a further purpose in preventing damage to the molding by external pressure during application.

Fig. 3 illustrated a modification of the invention where an additional strap 42 is molded between the base 18 and the apex 26 of the fastener. This strap 42 has any desired cross section and represents a reinforcement of the resilient tongues so as to increase the adhesive power of the fastener when it is pressed into the aperture because it prevents the tongue from expanding longitudinally with the bends 24 so that the accidental dislodgement of the fastener is prevented.

Since certain other obvious modifications may be made in this device without departing from the scope of the invention, it is intended that all matters contained herein be interpreted in an illustrative and not in a limiting sense.

I claim:

A molding fastener adapted for axial insertion within a complementary work aperture for use with a molding strip having inturned edges comprising a one piece plastic body having a shank including laterally spaced leg portions extending in the same general direction from the body converging at their ends to form a bight, a head portion extending radially outward from said body, said head portion having a longitudinal rib disposed on the medial lateral surface, shoulders intermediate the head and shank for cooperative engagement with the inturned edges of said molding strip and an integral bell member flaring outwardly and downwardly from said shoulders being of a diameter greater than said work aperture, whereby said bell member may be axially compressed and enter into sealing engagement therewith.

References Cited in the file of this patent

UNITED STATES PATENTS

| | | |
|---|---|---|
| 1,743,493 | Sipe | Jan. 14, 1930 |
| 1,915,249 | Jorgensen | June 20, 1933 |
| 2,703,428 | Redmond et al. | Mar. 8, 1955 |

FOREIGN PATENTS

| | | |
|---|---|---|
| 745,788 | Great Britain | Feb. 29, 1956 |
| 788,742 | Great Britain | Jan. 8, 1958 |